United States Patent
Borsboom et al.

[11] Patent Number: 5,807,410
[45] Date of Patent: Sep. 15, 1998

[54] PROCESS FOR REMOVING ELEMENTAL SULFUR FROM A GAS STREAM

[75] Inventors: Johannes Borsboom, Rijswijk; Jan Adolf Lagas, Monnickendam, both of Netherlands

[73] Assignees: Comprimo B.V., Amsterdam; Gastec N.V., Apeldoorn, both of Netherlands

[21] Appl. No.: 789,407

[22] Filed: Jan. 29, 1997

Related U.S. Application Data

[63] Continuation of Ser. No. 343,655, Nov. 22, 1994, abandoned.

[30] Foreign Application Priority Data

Nov. 30, 1993 [NL] Netherlands ............................ 9302081

[51] Int. Cl.⁶ ............................ B01J 25/00; C01D 17/04; B01D 53/00
[52] U.S. Cl. ........................ 23/293 S; 23/293 R; 95/291; 423/576.2
[58] Field of Search ............................ 423/573.1, 574.1, 423/576, 576.2, 576.8; 23/293 S, 294 R, 308 S; 95/291

[56] References Cited

U.S. PATENT DOCUMENTS

| | | | |
|---|---|---|---|
| 2,876,071 | 3/1959 | Updegraff | 423/574.1 |
| 2,876,670 | 3/1959 | Roberts, Jr. | 423/574.1 |
| 3,551,113 | 12/1970 | Cash | 23/262 |
| 3,838,979 | 10/1974 | Sims | 423/578.1 |
| 4,043,822 | 8/1977 | Karsay et al. | 423/543 |
| 4,046,867 | 9/1977 | Seeling et al. | 423/543 |
| 4,053,573 | 10/1977 | Harrer et al. | 423/543 |
| 4,391,791 | 7/1983 | Palm et al. | 423/574 |
| 4,526,590 | 7/1985 | Palm et al. | 55/27 |
| 4,726,353 | 2/1988 | Clawson | 126/350 R |
| 4,734,960 | 4/1988 | Bougard | 241/47 |

FOREIGN PATENT DOCUMENTS

| | | | |
|---|---|---|---|
| 2572952 | 5/1986 | France | |
| 1083790 | 6/1960 | Germany | |
| 50-61393 | 5/1975 | Japan | 423/576.2 |
| 57-145008 | 9/1982 | Japan | 423/576.2 |

OTHER PUBLICATIONS

Mellor, J.W. A Comprehensive Theatise on Inorganic & Theorictical Chemistry, vol. X, p. 19, Longmans Green & Co NY, NY 1930.

Paskua, Harold G, Sulfur Condensor Function & Problem Areas, Western Research Amsterdam 1981.

*Primary Examiner*—Gary P. Straub
*Attorney, Agent, or Firm*—Weingarten, Schurgin, Gagnebin & Hayes LLP

[57] ABSTRACT

The invention relates to a process for removing elemental sulfur which is present in a gas in the form of vapor and/or entrained particles, in which process the gas to be treated is cooled. The gas to be treated is introduced into a heat exchanger at the lower end thereof and with the aid of the temperature and/or the flow velocity of the cooling medium it is ensured that the wall of the heat exchanger has a temperature below the solidification point of sulfur and above the dew point of water, if any, present in the gas. The deposited sulfur is removed under the influence of gravity countercurrent to the gas to be treated.

14 Claims, 1 Drawing Sheet

PROCESS FOR REMOVING ELEMENTAL SULFUR FROM A GAS STREAM

This application is a continuation of application Ser. No. 08/343,655, filed Nov. 22, 1994, now abandoned.

TECHNICAL FIELD

This invention relates to a process for removing elemental sulfur which is present in a gas in the form of vapor and/or entrained particles, in which process the gas to be treated is cooled.

BACKGROUND OF THE INVENTION

Various methods are known for removing sulfur-containing compounds from gas streams. A well known method is the so-called Claus process. According to this method, in a thermal stage hydrogen sulfide is partially oxidized with oxygen from the air to form sulfur dioxide. Then, in the thermal stage and two or three catalytic stages, the reaction occurs, whereby from the sulfur dioxide formed and the residual hydrogen sulfide, sulfur and water are formed. The sulfur recovery degree of the conventional Claus process is 97–98% at a maximum. This percentage is relatively low in this branch of the technique, which gave rise to the need for methods by which the degree of recovery could be increased.

With the recently developed SUPERCLAUS process, theoretically sulfur recovery percentages of up to 99.5% can be achieved. This process utilizes a reactor which is arranged downstream of two or three Claus reactors, and in which the residual hydrogen sulfide is selectively oxidized to sulfur. In practice, the SUPERCLAUS process in which the selective oxidation stage is implemented with gas which has passed three Claus reactors yields sulfur recovery percentages of about 99.3%.

It has been found that about 0.4% of the 0.7% residual sulfur in the tail gas of a SUPERCLAUS plant is present in the form of elemental sulfur, while the other sulfur compounds are mainly present in the form of hydrogen sulfide and sulfur dioxide.

The efficiency loss in the sulfur recovery with the aid of a Claus plant, as a result of elemental sulfur which is present in the residual gas, is about 0.7–0.9% at a residual gas temperature of 150°C.

The official requirements regarding desulfurization efficiency are becoming increasingly stringent. The German authorities, for instance, require that sulfur recovery plants with a sulfur production exceeding 50 tons/day have a desulfurization efficiency of at least 99.5%.

To further increase the practical efficiency of, for instance, a SUPERCLAUS plant, it is possible to resort to a different process, for instance the SCOT process. With the aid of this process, sulfur compounds which are still present in the Claus residual gas are removed with the aid of organic compounds. However, such a process is very costly, while the equipment for implementing this process is relatively large in size.

SUMMARY OF THE INVENTION

According to the invention, it has now been found that higher sulfur recovery percentages can be achieved if sulfur-containing gas is cooled down in a heat exchanger the wall of which has a temperature which is lower than the solidification point of sulfur and which is higher than the dew point of water if this is present in the gas.

Possibly, an explanation for the underlying principle of this invention can be found in the product properties of elemental sulfur in general, since this substance accounts for the greater part of the residual sulfur content of the tail gas of a sulfur recovery plant, for instance a SUPERCLAUS plant.

From Kirk-Othmer, Encyclopedia of Chemical Technology, third edition, Volume 22, John Wiley & Sons, pages 78 et seq, it is known that liquid elemental sulfur crystallizes at atmospheric pressure at 114.5° C. in the monoclinic crystal form, which form has a density of 1.96 $g/cm^3$. Further, it is known that solid sulfur, at atmospheric pressure and at 95.5° C., passes into the rhombic form having a density of 2.07 $g/cm^3$. Possibly, the difference in the densities of these two crystal forms is the key to the present invention.

The present invention might then make use of the fact that the density increases suddenly at each phase transition in the crystal form (amorphous→monoclinic→rhombic) and the volume of the amount of solid sulfur accordingly decreases by about 2% from amorphous to monoclinic and by about 6% from monoclinic to rhombic. As a result of these sudden changes in volume, solid sulfur can come off a surface on which it has been deposited. It is stressed that this theory is a possible explanation of the advantages of the process according to the invention. This theoretical explanation may therefore not be construed as limiting the present invention.

The process for removing elemental sulfur which is present in a gas in the form of vapor and/or entrained particles, in which process the gas to be treated is cooled, is characterized, according to the invention, in that the gas to be treated is introduced into a heat exchanger. With the aid of the temperature and/or the flow velocity of the cooling medium, it is ensured that the wall of the heat exchanger has a temperature below the solidification point of sulfur and above the dew point of water, if any, present in the gas, and that the deposited sulfur is removed under the influence of gravity.

Preferably, the gas to be treated is introduced into a heat exchanger at the lower end thereof, so that the deposited sulfur is removed countercurrent to the gas to be treated.

DETAILED DESCRIPTION OF THE INVENTION

Figure 1:
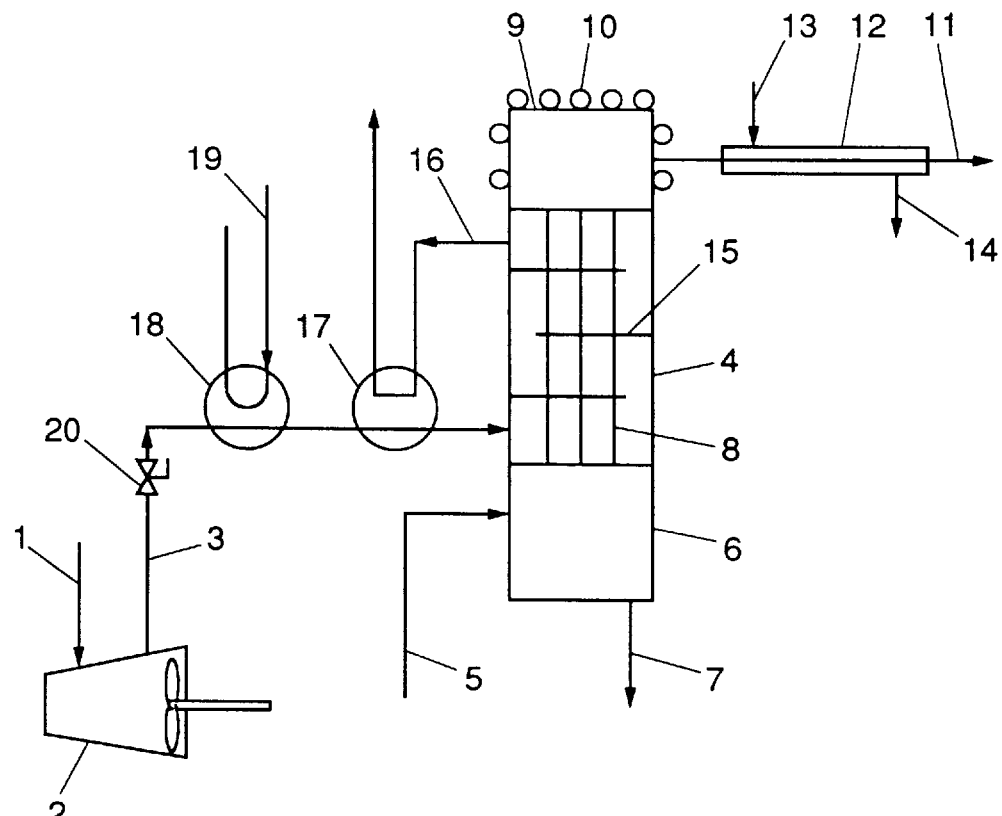
FIG. 1 shows an embodiment of the invention in which a vertically disposed heat exchanger is used.

It is noted that processes and apparatus are known in which use is made of the precipitation of sulfur vapor in solid form.

U.S. Pat. No. 4,526,590, for instance, describes a process and an apparatus for recovering sulfur vapor from Claus process gas. To that end, the process gas is cooled on a cold surface in a heat exchanger, in order to precipitate the greater part of the sulfur vapor in solid form. The heat exchanger is stripped of solid sulfur from time to time through heating. During this heating the precipitated sulfur is brought into the liquid phase, whereafter the sulfur flows out of the heat exchanger. In a second cooling section the water vapor present in the process gas is condensed. Apart from the fact this process is complicated, it is a disadvantage that condensation of process water gives rise to serious corrosion and blockage problems. Accordingly, the process according to U.S. Pat. No. 4,526,590 has not been introduced in practice.

U.S. Pat. Nos. 2,876,070 and 2,876,071 describe a similar process to that described in U.S. Pat. No. 4,526,590, but without the condensation of water vapor. Characteristic of the plants which are used in these processes is the presence of shut-off valves which are periodically closed. When the shut-off valves are in the closed position, the heat exchanger used can be set out of operation for the purpose of removing the solid sulfur from the heat exchanger pipes through heating to above the melting temperature of sulfur.

An important disadvantage of these processes, which is recognized in the art, resides in the presence of shut-off valves in the mainstreams of the plants used. Such shut-off valves lead to high investment costs, cause pressure drop, give rise to problems of operation and maintenance, and are susceptible to malfunction.

On account of the problems associated with the known processes utilizing the precipitation of solid sulfur, more particularly the blockage problems, the prevalent view in the art is that a gas stream to be treated in which residual sulfur is present has to be cooled to a temperature which is at least above the solidification point of sulfur. In that case, the sulfur liquefies. By ensuring that the heat exchanger makes an angle of inclination with the horizontal plane, the liquid sulfur can flow down to a sump. In these conventional sulfur condensers, the liquid sulfur flows down in cocurrent with the gas.

If this condensation technique is used, not all of the sulfur is removed form the gas to be treated. This is essentially attributable to the much higher vapor pressure of sulfur in liquid condition in comparison with that of sulfur in solid condition. In the case of sulfur in liquid condition, the vapor pressure is higher by about a factor of 10. Illustrated with values, the sulfur vapor pressure falls from 8.0 Pa at 130° C. to 0.7 Pa at 100° C.

The problems arising in the conventional sulfur condensers and in the known cold heat exchangers do not occur when the process according to the invention is used.

The invention relates to a simple continuous process for removing sulfur from gas streams containing sulfur vapor and/or entrained sulfur particles.

Without wishing to be bound by any particular theory, the following explanation for the process according to the invention is given.

By passing a gas to be treated into an inclined heat exchanger at the lower end thereof and cooling this gas with a cooling medium, the wall of the heat exchanger having a temperature below the solidification point of sulfur and above the dew point of water, if any, present in the gas—all in accordance with the invention—the following processes are expected to occur.

The sulfur will be deposited on the wall in the form of solid, amorphous sulfur or liquid sulfur—all depending on the sulfur supply from the gas phase. The sulfur in liquid form will slowly solidify to form substantially amorphous sulfur. Depending on the interaction between the temperature of the gas and the temperature of the wall, the amorphous sulfur will first pass into sulfur in the monoclinic form. The density of amorphous sulfur, 1.92 g/cm$^3$, is well over 2% lower than the density of monoclinic sulfur. Under further cooling, monoclinic sulfur subsequently forms rhombic sulfur. This phase transition, as mentioned above, is accompanied by a relative large decrease in volume of the crystalline sulfur. As a result of the above-described changes in volume, sulfur crystals will come off the wall and fall out of the heat exchanger under the influence of gravity.

The recrystallization from amorphous sulfur to monoclinic sulfur and then to rhombic sulfur proceeds relatively slowly. As a result, it will take some time for the monoclinic and subsequently rhombic sulfur to form on the cold heat exchanger wall. In particular, sulfur in the rhombic crystal form will come off the wall through shrinkage and then fall down. Normally, the entire heat exchanger wall will first be covered with solid sulfur.

As is known, sulfur in solid form has a strongly insulating effect. This contributes to the circumstance that sulfur which is in direct contact with the wall will not be strongly heated by the hot gas which is being passed through the heat exchanger, so that this solid sulfur will adopt the temperature of the wall and thus will pass into the rhombic form sooner. On the side of the sulfur layer which is in contact with the hot gas, a stable condition is established, where sulfur vapor and sulfur particles to be further separated do not sublime (solidify), but condense. This liquid sulfur of a temperature of about 114.5° C. will flow down.

According to the process of the invention, an effective sulfur separation is realized by means of a combination of solidification, settlement and condensation, which process need only be interrupted occasionally to remove an excess of solidified sulfur from the heat exchanger so as to prevent total blockage. If the temperature of the gas leaving the heat exchanger rises above about 120° C., not all of the sulfur will be deposited on the heat exchanger wall anymore. For the (automatic) control of the cooling of the heat exchanger, use can be made of the variation in the temperature of the output gas.

As cooling medium, air, water or any other suitable medium can be used. Heated cooling air or heated cooling water can often be used for other purposes. For instance, heated air can be used as combustion air for a thermal or catalytic after-burner.

Depending on the cooling medium used and the temperature of the cooling medium, cocurrent or countercurrent cooling can be used. When outside air is used as cooling medium, use is made of cocurrent cooling, in order to avoid the wall temperature falling below the dew point of water, if any, present in the gas to be treated.

As stated above, the temperature and/or the flow velocity of the cooling medium are chosen such that the water dew point of the process gas is not attained. This means that the temperature of the process gas and of the cooling wall should remain at least so high that no condensation of water arises. It will be clear that this is a limitation with regard to the amount of sulfur which can be separated per unit time and per unit area. However, it is of crucial importance to prevent condensation of water.

In fact, it is well known that acid gases, and particularly $SO_2$, are soluble in water and so can create a condensate with a very high degree of acidity. This condensate is particularly corrosive, and requires acid-resistant and hence expensive construction materials. Moreover, $H_2S$ and $SO_2$, which compounds are both present in the gas to be treated, react with each other in the aqueous phase to form elemental sulfur. This elemental sulfur gives, in water, a colloidal solution, the so-called Wackenroder solution, which cannot be economically processed.

The water dew point depends on the composition and the pressure of the gas to be treated and is easy to determine experimentally. For process gas coming from a Claus plant, which generally contains about 30 vol. % water vapor, the water dew point is about 70° C. at atmospheric pressure.

The gas in the process according to the invention is substantially cooled to a temperature between the water dew point and 120° C., the temperature at which sulfur liquefies.

It is preferred to ensure that the wall has a temperature which is at least 2° C. above the dew point of the water. This temperature margin compensates fluctuations in the composition of the gas to be treated and hence in the dew point of water. At the same time this margin provides the advantage of preventing condensation of sulfurous acid, $H_2SO_3$, the dew point of which is just above that of water.

In a preferred embodiment of the process according to the invention, it is ensured that the heat exchanger wall has a temperature of at most 95.5° C. Possibly, monoclinic sulfur then passes into the rhombic form.

The process according to the invention can be suitably practiced if the gas to be treated which is passed to the heat exchanger has a temperature between 120° C. and 300° C.

In principle, the process according to the invention can be applied to any gas in which elemental sulfur is present. However, it is practical if the greater part of the sulfur compounds has already been removed from the gas to be treated. Normally, the gas to be treated will come from a sulfur recovery plant.

The heat exchanger which is used in the present invention can essentially be any heat exchanger or sublimator, as long as the gas to be treated can be introduced at the underside and the solid or liquid sulfur can be discharged under the influence of gravity. Highly suitable is the use of a tube or plate heat exchanger.

Such a tube or plate heat exchanger has to be positioned at a slant, the angle with the horizontal plane being preferably more than 45°.

A preferred embodiment of the process of the invention is characterized in that the tube or plate heat exchanger is disposed vertically.

In the case where a heat exchanger is used which comprises vertically disposed pipes or plates, the separation of sulfur is promoted when the gas stream through the heat exchanger is turbulent. This makes for optimum contact between the gas and the wall which may or may not be covered with sulfur.

In general, it is to be ensured that the gas velocity is sufficiently high to maintain a Reynolds number greater than 2000–3000. Too high a gas velocity prevents the formed liquid sulfur from flowing out of the heat exchanger under the influence of gravity, since the gas stream is countercurrent to the sulfur to be discharged.

A turbulent gas flow is not a prerequisite for pipes or plates which slant. In that case, the gas flow may be laminar, since the elemental sulfur which is present in the gas stream will reach the wall anyhow.

Further, it is advantageous if a heat exchanger is used of which the walls have an absolute roughness of less than 0.05 mm, since upon recrystallization to the rhombic crystal form the sulfur will come off most readily in a heat exchanger with walls which are as smooth as possible.

In order to increase the cooling surface in a heat exchanger, projections may be provided on or in the wall of the heat exchanger. The shape of these projections is not critical as long as it is ensured that fragments of solid sulfur are not blocked when being removed under the influence of gravity. Projections which are eligible for the purpose may, for instance, be pointed and downwardly directed.

The process according to the invention results in an effective sulfur separation by means of a combination of solidification, settlement and condensation. This process is, in principle, implemented continuously.

It remains possible, however, that a malfunction occurs occasionally. If such malfunction gives rise to a blockage, it can be simply and quickly removed. The cooling of the heat exchanger can be switched off or a fluid of a high temperature can be passed through the cooling system in order to ensure that the solid sulfur passes into the liquid form and can flow away. This step is suitably carried out in a time so short as to make it unnecessary to stop the sulfur removal process.

If the solid sulfur does not come off the wall of the heat exchanger, this process can be accelerated by vibrating the heat exchanger in its entirety from time to time by means of a suitable vibrating device.

The dimensions and form of the heat exchanger are not critical as long as such a distance remains between the walls of the heat exchanger that a stable equilibrium can be established without giving rise to blockage.

Preferably, heat exchangers which are used in the process according to the invention are manufactured from corrosion-resistant materials. Highly suitable materials are aluminum and stainless steel.

The present invention will now be further elucidated with reference to the drawings:

In FIG. 1 outside air is sucked in through pipe 1 by fan 2, which passes sufficient cooling air in cocurrent cooling by way of pipe 3 through heat exchanger 4.

Preheater 18 and/or heat exchanger 17 provide an appropriate air inlet temperature of the cooling air, in order to avoid condensation of water vapor on the inlet side of the process gas.

The process gas to be cooled, which contains sulfur vapor and entrained sulfur particles, is fed through pipe 5 to inlet chamber 6 of the heat exchanger 4.

The condensed sulfur is discharged through pipe 7. The process gas is passed through the heat exchanger pipes 8 to the outlet chamber 9, which comprises steam heating coils 10. The outlet chamber of the heat exchanger comprises a heating element to prevent the deposition of solid sulfur.

The process gas leaves heat exchanger 4 through pipe 11, which is provided with a steam heating jacket 12 to which steam is fed through pipe 13. The condensate of this steam heating is discharged through pipe 14.

The cooling air flows in cocurrent through heat exchanger 4, partitions 15 ensuring that a proper heat transfer takes lace between the cooling medium and the process gas. The heated air leaves heat exchanger 4 through pipe 16.

The amount of cooling air to be supplied is controlled with control valve 20, in such a manner that the heated cooling air in pipe 16 has a temperature such as to also prevent any water condensation in the outlet of heat exchanger 4 on the process gas side.

The air preheater 18 can be used to strip the heat exchanger of solidified sulfur, if necessary. To that end, through pipe 19 steam is fed to the air preheater 18 and the outside air is further raised in temperature before being passed through the heat exchanger 4.

Figure 2:
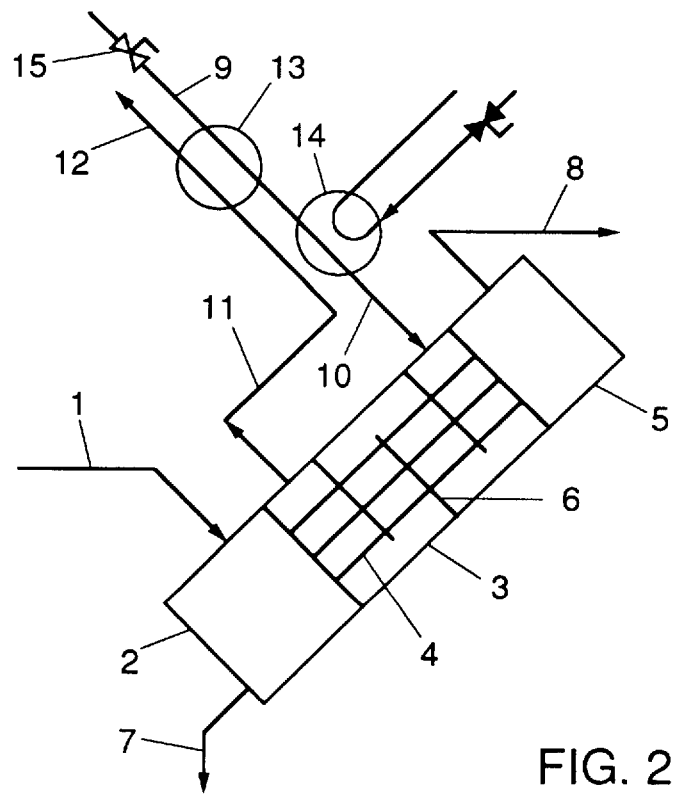
FIG. 2 shows an embodiment of the invention in which an inclined heat exchanger is used.

The embodiment outlined in FIG. 2 utilizes cooling with cooling water as cooling medium, which is supplied countercurrent to the gas to be cooled.

The process gas to be cooled is fed to heat exchanger 3 through pipe 1 and then passed through pipes 4 of heat exchanger 3. The process gas is introduced through inlet chamber 2, where also the condensed sulfur is discharged through pipe 7. The cooled gas leaves the heat exchanger 3 through outlet chamber 5 and pipe 8. The cooling water is supplied through pipe 9 and brought to the proper temperature with heat exchanger 13 and steam heater 14.

The cooling water traverses heat exchanger 3 along the outside of the cooling pipes 4 under the guidance of baffles 6.

The cooling water temperature of the input pipe 10 and output pipe 11 is sufficiently high to avoid water condensation in pipes 4. The cooling water is discharged through pipe 12.

The cooling water flow rate is controlled with valve 15 which is controlled by the cooling water temperature in pipe 11.

With reference to the example, the process according to the invention will be further elucidated.

EXAMPLE

An amount of process gas coming from a sulfur recovery plant was fed to the heat exchanger outlined in FIG. 1. This gas in an amount of 884 kg/h had a temperature of 138° C., a pressure of 1.10 bar absolute and contained 1.0 kg/h sulfur vapor and 1.7 kg/h entrained sulfur particles in the form of droplets. As cooling medium, preheated outside air was used in co-current. The amount of cooling air was 2000 kg/h at an inlet temperature of 50° C. The heat exchanger comprised 33 smooth, vertically arranged aluminum pipes of a pipe length of 2.3 meter and an internal diameter of 45 mm. These conditions gave rise to a turbulent flow profile with a Reynolds number of 11300. The temperature of the pipe wall was 75° C. on the inlet side and 77° C. on the outlet side. The process gas was thus cooled to 105° C.

The amount of cooling air was controlled depending on the process gas outlet temperature.

Of the sulfur present in the process gas in the form of sulfur vapor and sulfur droplets, 2.5 kg/h was removed from the process gas, which is 92% of the sulfur supplied. The greater part of this sulfur flowed from the heat exchanger in the form of liquid sulfur.

The heat exchanger was regenerated every three days. To that end, the cooling air was raised in temperature to 138° C. with the aid of the air preheater. During this 15-minute regeneration procedure the solid sulfur present in the pipes was melted and discharged.

We claim:

1. A process for removing elemental sulfur from a claus tail gas stream, said method comprising the steps of:

introducing the gas stream containing said elemental sulfur, said elemental sulfur being in the form of at least one of sulfur vapor and entrained sulfur particles, into the lower end of an inclined heat exchanger, said heat exchanger being inclined from the horizontal plane by an angle greater than 45° and having an inner wall, said inner wall of the heat exchanger being maintained, throughout the entire length of the heat exchanger, at a temperature below the solidification temperature of sulfur and above the dew point of water in the gas stream by flow of a coolant;

cooling the upwardly flowing gas stream in the heat exchanger, so as to establish a deposited layer of solid sulfur on the gas stream side of the inner heat exchanger wall;

continuing to cool said upwardly flowing gas stream by said flow of said coolant so that, after said solid elemental sulfur layer is established, elemental sulfur condenses as a liquid onto said solid sulfur layer; and collecting said condensed liquid elemental sulfur from the heat exchanger by gravity flow, said introducing, continuing to cool and collecting steps being carried out in a continuous mode.

2. The process according to claim 1, wherein the gas stream has a temperature between 120° C. and 300° C. when introduced to the heat exchanger.

3. The process according to claim 1, wherein the gas stream is cooled to a temperature between the dew point of any water in the gas and 120° C.

4. The process according to claim 1, wherein said wall of the heat exchanger is maintained at a temperature at least 2° C. above the dew point of any water in the gas.

5. The process according to claim 1, wherein said inner wall is maintained at a temperature of at most 95.5° C.

6. The process according to claim 1, wherein the gas stream is from a sulfur recovery plant.

7. The process according to claim 1, wherein the heat exchanger is tube or plate-shaped.

8. The process according to claim 1, wherein the heat exchanger is disposed vertically.

9. The process according to claim 1, wherein said inner wall of the heat exchanger has an absolute roughness of less than 0.05 mm.

10. The process according to claim 1, wherein the gas stream has a temperature between 120° C. and 300° C. when introduced to the heat exchanger and is cooled to a temperature between the dew point of water and 120° C., and said wall of the heat exchanger has a temperature at least 2° C. above the dew point of water in the gas and at most 95.5° C.

11. The process according to claim 10, wherein the heat exchanger is disposed vertically.

12. The process according to claim 10, wherein said inner wall of the heat exchanger has an absolute roughness of less than 0.05 mm.

13. The process according to claim 1 or claim 10, wherein the gas stream is cooled by cocurrent flow of a coolant.

14. The process according to claim 1 or claim 10, wherein the gas stream is cooled by countercurrent flow of a coolant.

* * * * *